United States Patent [19]

Jensen

[11] Patent Number: 5,766,390
[45] Date of Patent: Jun. 16, 1998

[54] METHOD AND APPARATUS FOR CONVERTING PLASTIC

[75] Inventor: John D. Jensen, Aurora, Ohio

[73] Assignee: Illinois Tool Works, Inc., Glenview, Ill.

[21] Appl. No.: 124,334

[22] Filed: Sep. 20, 1993

[51] Int. Cl.$^6$ .......................... B32B 31/12; B32B 31/26; B44D 5/00
[52] U.S. Cl. .......................... 156/82; 156/203; 156/251; 156/258; 156/466; 156/495; 156/497; 156/515
[58] Field of Search .......................... 156/82, 203, 251, 156/466, 497, 515, 495, 258

[56] References Cited

U.S. PATENT DOCUMENTS

| | | | |
|---|---|---|---|
| 2,459,234 | 1/1949 | McDowall | 156/497 |
| 2,474,917 | 7/1949 | Schenk | 156/497 |
| 2,990,875 | 7/1961 | Samuels et al. | 156/251 X |
| 2,997,098 | 8/1961 | Riese et al. | 156/497 |
| 3,066,064 | 11/1962 | Pommer | 156/82 |
| 3,257,256 | 6/1966 | Lehmacher et al. | 156/495 |
| 3,408,242 | 10/1968 | Rochla | 156/82 X |
| 3,736,219 | 5/1973 | McTaggart | 156/82 X |
| 3,788,917 | 1/1974 | Linda | 156/82 |
| 3,850,716 | 11/1974 | Podvin | 156/82 |
| 4,240,855 | 12/1980 | Pennington | 156/258 X |
| 4,243,449 | 1/1981 | Swartz | 156/82 |

Primary Examiner—David A. Simmons
Assistant Examiner—Paul M. Rivard
Attorney, Agent, or Firm—Watts, Hoffmann, Fisher & Heinke Co., L.P.A.

[57] ABSTRACT

A tube-forming machine and process has a supply for delivering an elongate, folded, plastic web along a path of travel. The web may be clear polyethylene folded treated surface to treated surface. A cutting mechanism is positioned along the path including a hard cylindrical roll and a cutter having a cutting head and means to bias the head toward the roll. A rotatable sealing drum has a cylindrical web engaging surface delineating a further portion of the path. A set of circumferentially spaced flame-emitting nozzles are positioned adjacent the drum surface section. Each of the nozzles includes a tip disposed within the cylinder delineated by said drum surface and has an axis disposed in an imaginary radial plane. Each tip is directed radially upwardly to impinge its flame against portions of a web being fed along the path when such portions project from said drum surface. Each tip axis is at an angle from 90° to 60° with an imaginary line located by the intersection of such imaginary plane with said drum surface section with the 60° orientation of the tip axis being canted toward the drum. Preferably each tip axis is canted toward the drum at an angle of from 65° to 68° with said imaginary line.

23 Claims, 5 Drawing Sheets

METHOD AND APPARATUS FOR CONVERTING PLASTIC

FIELD OF THE INVENTION

This invention relates to plastic conversion, and more particularly, to a method and apparatus for converting a folded plastic web into a tube.

CROSS-REFERENCE TO RELATED APPLICATION

This application is directed to improvements over the method and apparatus disclosed in co-pending application Ser. No. 08/004,629, filed Jan. 14, 1993, now abandoned, as a continuation of Ser. No. 07/846,943, filed Mar. 6, 1992, now abandoned, which, in turn, was a continuation of Ser. No. 07/309,333, filed Feb. 10, 1989 by Bernard Lerner et al., and entitled *Method and Apparatus for Manufacture of Tubing*, now abandoned, referred to here as the Hydrogen Sealer application. The Hydrogen Sealer application is hereby incorporated by reference in its entirety.

BACKGROUND OF THE INVENTION

The mechanism of the Hydrogen Sealer application first prints a polyethylene web, and then folds it, printed side out. The folded web is fed past a trimmer to trim edges remote from the fold. The trimmed web is then fed over a large rotating drum with small portions of the web adjacent to the trimmed edges projecting outwardly from the drum. A set of copper hold-down rollers engage the web to maintain it against the drum and function with the drum as heat sinks.

A set of torches are provided with each torch having a tip paired with one of the hold-down rollers, and oriented to direct a flame generally radially inwardly and downwardly to fuse the projecting portions. Each of these torches provides a thin, hot, intense flame, and each is fueled by a stoichiometric mixture of hydrogen and oxygen.

While the machine and method of the Hydrogen Sealer application has been highly successful, there remains a problem that, on occasion, defective seals are produced. There are believed to be a number of factors which contribute to this problem.

One of the factors contributing to the problem is that the hold-down rolls must be properly aligned. If the axes of the drum and a hold-down roll are in a common plane but not parallel, one end portion of the hold-down roll will tend to pinch the web while the remote end portion may be out of contact. The result can be improper juxtaposition of the layers being fused. If the axes of a hold-down roller and the drum are not in a common plane, the upper layer of the web will tend to track in the direction of malalignment of the hold-down roller which may result in air being entrained into the seal being formed.

While the elasticity of the polyethylene provides a certain amount of "forgiveness" for hold-down roll malalignment, nonetheless if not properly maintained, hold-down roll malalignment and foreign matter build-up on the rolls can each contribute to the production of defective products. Accordingly substantial amounts of maintenance are required.

Another factor contributing to the problem with the machine of the Hydrogen Sealer application is that the trimming operation is performed with a blade aligned with a groove in a back-up roll. There is a tendency for the blade to push the layers of plastic into the groove and produce a trim that is skewed rather than perpendicular. This improper trimming can result in a projecting portion of a layer of plastic which is against the drum during the sealing operation projecting further from the drum than its adjacent layer. Thus, poor trimming can contribute to seal malformation.

Even when the machine of a Hydrogen Sealer application is functioning perfectly, it is necessary to fold the web with the so-called treated, that is printed, side out because it is unable to fuse juxtaposed treated surfaces with desired consistency. As a consequence, where tubular labels are being manufactured, it is necessary to apply a protective coat of varnish over the printing to maintain the integrity of the printed design and message during use.

With the process and apparatus of the Hydrogen Sealer application, it has also been found necessary to use so-called white polyethylene. White polyethylene is pigmented with titanium dioxide. It has now been discovered that the titanium dioxide functions as a heat sink assisting in retaining heat within the polyethylene layers and thereby enhancing the formation of the seal. Polyethylene has the characteristic of becoming a very effective insulator once melted, so that absent the titanium dioxide, the layer against which the flames impinge shields its adjacent layer from heat to the point where, during production with the machine of the Hydrogen Sealer application, quality seals are not produced with the desired consistency.

SUMMARY OF THE INVENTION

With the method and apparatus of this invention, the described problem with, and limitations of, the method and apparatus of the Hydrogen Sealer application are overcome. Not only are high-quality seals consistently produced, but considerable savings are realized by eliminating the hold-down rolls and their attendant maintenance requirements. Seals can be effected between treated surfaces and clear polyethylene can be used so that the printing can be on the interior rather than the exterior of the finished label. Interior printing on clear plastic produces an approximate ten percent saving in material cost by eliminating the need for varnish to protect the printing. Moreover, the number of flame jets required are reduced, producing additional maintenance and operating cost savings.

The first novel step in the improved apparatus and process, apart from folding the web treated surface to treated surface, is embodied in the trimming operation. The folded web is passed around a hardened steel roll and a cutter is biased against superposed and juxtaposed marginal portions of the web remote from the fold to effect the trimming operation.

While the trimming can be effected by any of cutting with a blade, a hot knife or a so-called score cutter, the score cutter is preferred. The scoring cutter or head is a relatively dull knife as contrasted with the cutter blade of the Hydrogen Sealer application. The scoring head is air biased against the folded web to effect the trimming operation by a combination of the knife-like action of the scoring head and a compression of the folded web. The result is both a highly accurate trimming and alignment of the trimmed edges and, in addition, a tacking or partial fusing of those edges together so that they maintain their alignment throughout the seal formation operation.

Once trimmed, the web is fed around the sealing drum which is the drum of the Hydrogen Sealer application mechanism. Flame is directed against projecting marginal edge portions radially upwardly rather than radially downwardly of the drum. This tip orientation produces a number of advantages. These advantages include:

1. The hold-down rolls are eliminated because, with this orientation, the drum itself is an adequate heat sink to maintain portions of the web engaging the drum which are not to be fused sufficiently cool so that only projecting portions are welded and fused.

2. Since heat rises, the upward direction of the jets results in convectionally transmitted heat energy to the layer of the film remote from the burner tip assisting in the fusing action.

Tests have shown that the described arrangement is optimized when the axes of the jet tips are in a range of from 60° canted inwardly toward the drum to 90° with the axis of the drum and with the drum cylindrical surface. Preferably, the angle is within the range of about 65°–68°. Tests have further shown that it is possible consistably to produce effective seals with clear polyethylene treated surface to treated surface.

In order to utilize the torch supports of the machine of the Hydrogen Sealer application, and to position jets within the limited space available to concurrently produce two tubes as taught in the Hydrogen Sealer application, bodies of the torches have axes which are canted rather than radial and torch tips are bent to an angle of about 60° (120° from the original orientation).

In the preferred arrangement, tests have shown that 14 jets circumferentially spaced over a span of about 180° of arc produce superb seals in even the heaviest of materials. With thin materials only some and not all of the jets are used. For example, with 2 mil polyethylene, only 10 of these jets are used with the first 7 effecting seal formation and the other 3 serving to smooth and anneal the formed bead seal. The annealing of plastic enhances the physical properties of the finished seam.

Accordingly, the objects of the invention are to provide a novel and improved method and apparatus for fusing juxtaposed plastic layers together.

PREFERRED EMBODIMENT OF THE INVENTION

Figure 1:
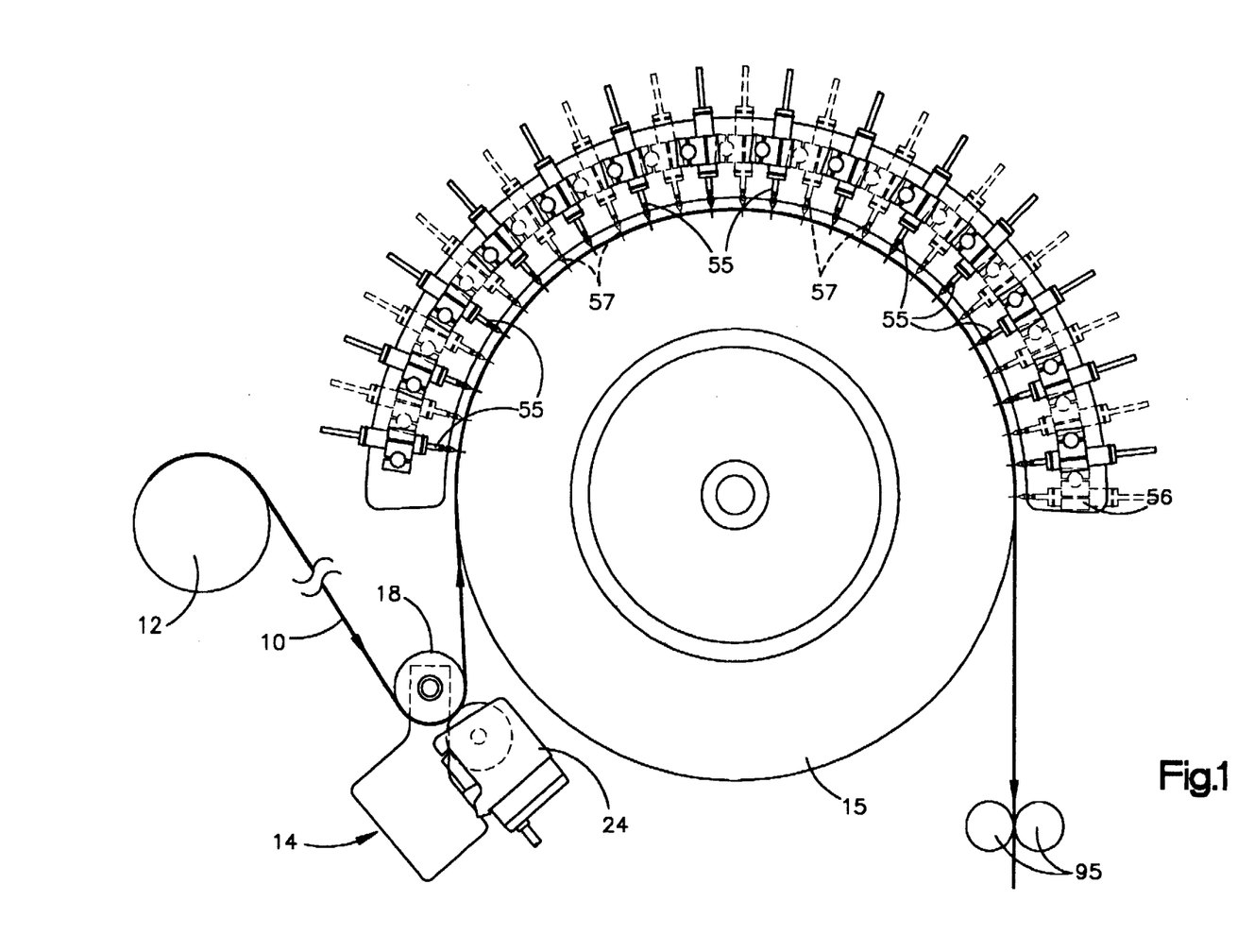
FIG. 1 is a somewhat schematic view of a machine embodying the invention of this application, including a supply, a trimming mechanism, a seal drum and a torch fusing assembly.

Referring now to the drawings in FIG. 1 in particular, a web 10 is fed from a web supply 12 along a path of travel to a trimming or cutting mechanism 14. The web is then fed upwardly and over a large cylindrical drum 15 and thence to a take-up mechanism (not shown). Where tubular sleeve labels are being formed, a perforating mechanism is positioned between the drum and the take-up mechanism to form transverse lines of weakness delineating the ends of the labels being manufactured. In the preferred label manufacturing operation, the web is printed clear plastic folded treated surface to treated surface.

Figure 4:
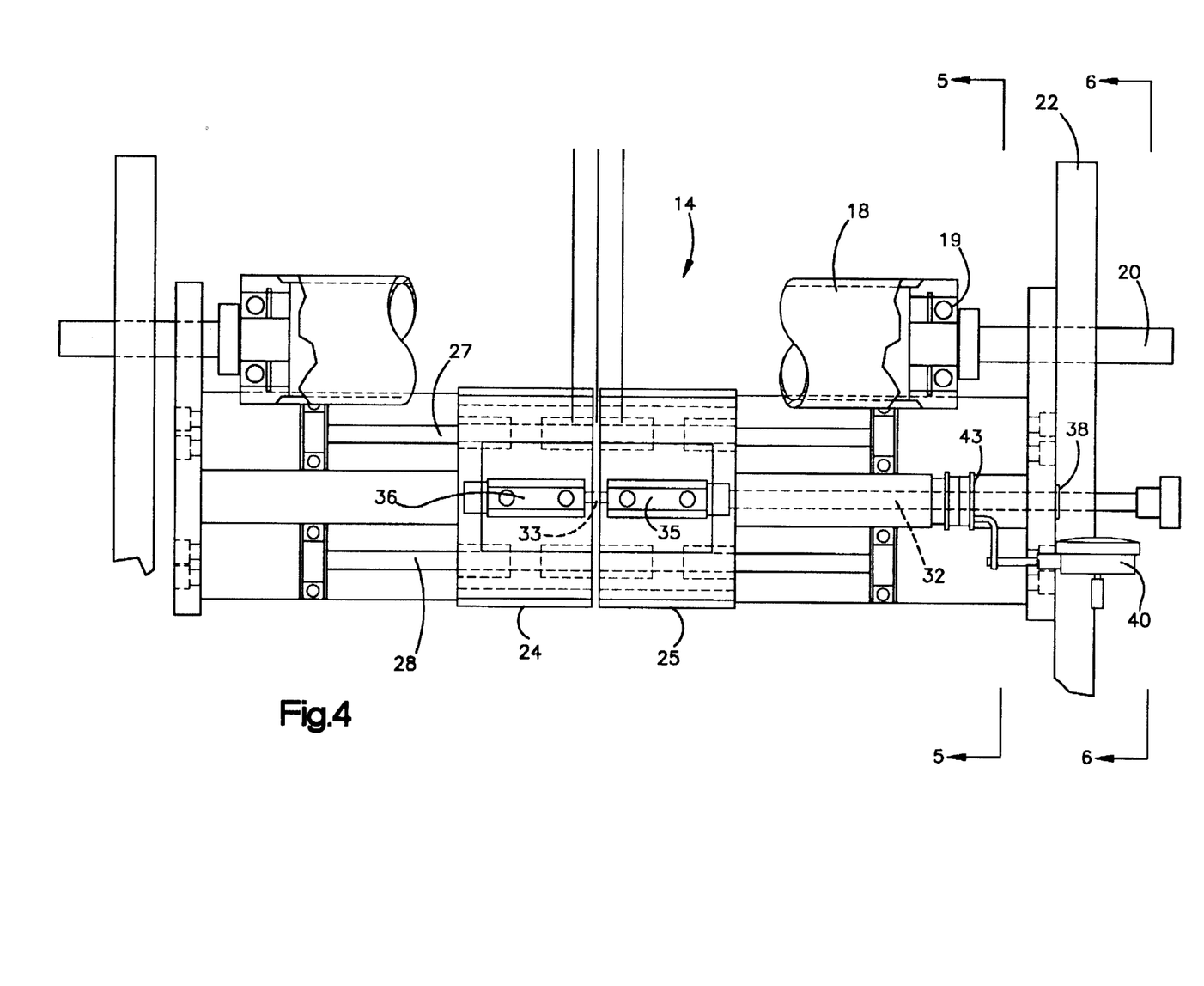
FIG. 4 is an enlarged elevational view of the trimming mechanism.
Figures 5, 6:
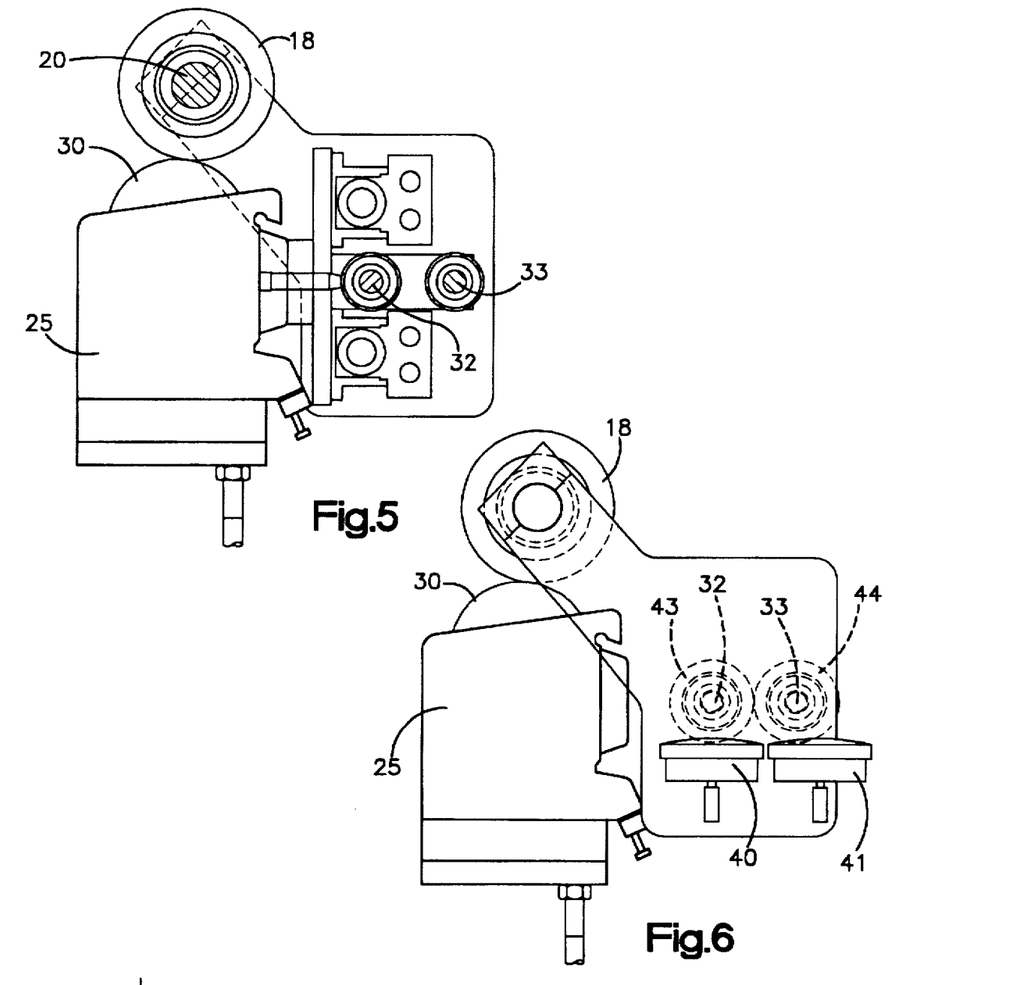
FIG. 5 is a sectional view of the trimming mechanism as seen from the planes indicated by the line 5—5 of FIG. 4.
FIG. 6 is an end elevational view of the trimming mechanism.

Referring to FIGS. 4–6, the trimming mechanism 14 includes an induction hardened, cylindrical, steel roll 18 about which the web is fed. The roll 18 is journaled by bearings 19 for rotation about a shaft 20. The shaft 20 is supported by a frame 22 of the trimming mechanism 14. The trimming mechanism as shown in FIG. 4, is equipped for the concurrent manufacture of a pair of tubes. Accordingly, the trimming mechanism has a pair of cutters 24, 25.

The cutters 24, 25 are respectively mounted on guide rods 27, 28 which parallel the trimmer roll 18. The cutters 24, 25 respectively have score cutter heads, one of which is shown at 30, it being recognized that the cutter 24 includes an identical cutter head. Each cutter includes an internal air piston (not shown) for biasing its cutter head toward the trimmer roll 18. The biasing of the cutter heads 30 toward the trimmer roll 18 provides the force which effects the score cut of a workpiece passing around the trimmer roll 18. The preferred cutters 24, 25 are obtained from Dienes Werke of Overath, Germany. The preferred blade 30 is a number 021058 while the holder is a type PQAS Crush Cut Holder.

In order to properly laterally locate the trim of a workpiece passing around the trimmer roll 18, the cutters 24, 25 are respectively and independently laterally adjustable along the guide rods 27, 28. A pair of adjustment rods 32, 33 are respectively threadedly connected to the frame 22 to provide adjustment of the cutters 24, 25, respectively. Roller assemblies 35, 36, FIG. 4, respectively engage the cutters 24, 25 and are connected to the adjustment rods 32, 33. Rotation of the rods effects lateral adjustment of the cutters due to the threaded engagement with the frame. Jam nuts, one of which is shown at 38, are provided to fix the cutters in adjusted positions.

Dial indicators 40, 41 are mounted on the frame 22. The dial indicators act against target indicators 43, 44 on the adjustment rods to provide precise guidance for adjusting the location of the cutters.

Figure 2:
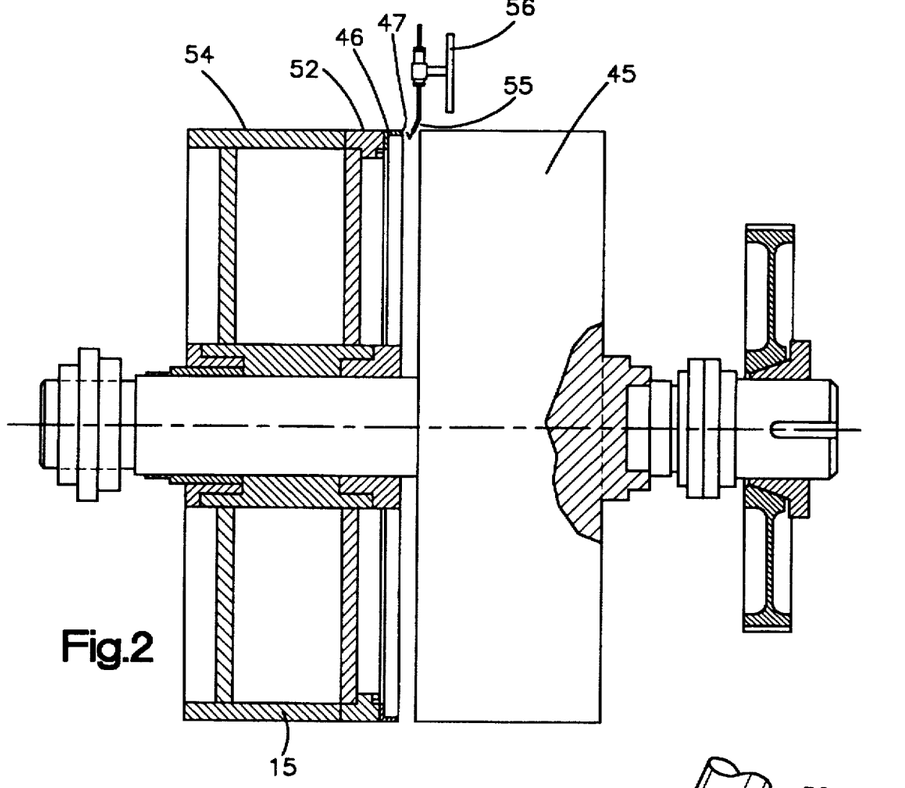
FIG. 2 is an elevational view partly in section of the sealing drum and a torch mechanism.
Figure 3:
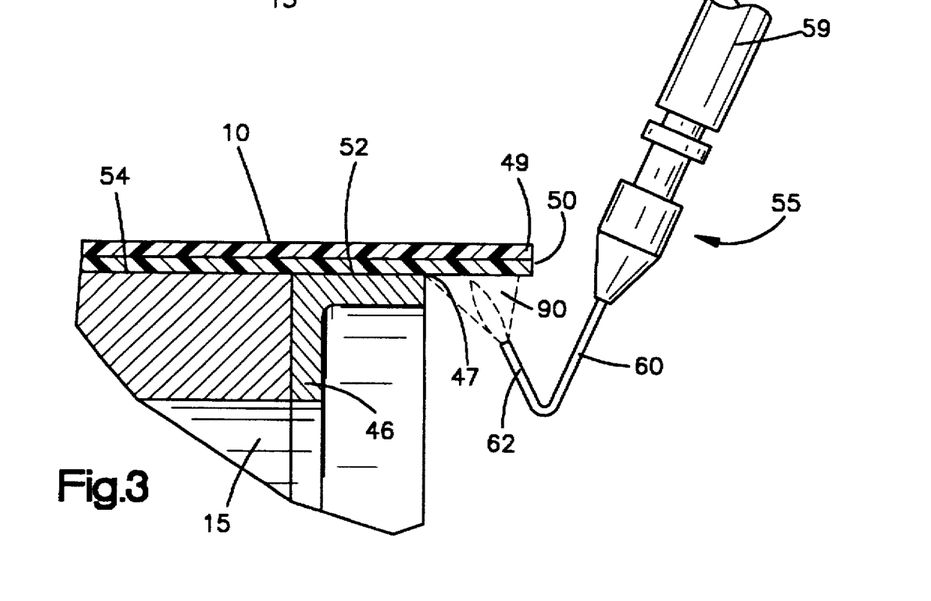
FIG. 3 is an enlarged view depicting one of the torches and a fusing operation.

Referring now to FIGS. 2 and 3, the drum 15 includes a pair of stainless steel rings 45, 46. Since the rings are mirror images, only the ring 46 will be described in detail. The ring 46 functions as a heat sink to absorb the seal formation heat and thereby maintain contacting web sections in an unmelted state. The ring 46 includes an edge 47 which delineates a demising line between that portion of the workpiece 10 which is maintained in a relatively cold, unmelted condition and projecting lips 49, 50 from which a bead seal is formed. Where the tubing being formed is formed from 2 mil polyethylene, the lips are preferably 0.030+ or −0.005 inches in axial length.

The ring 46 has a cylindrical circumferential surface 52 which is aligned with, and forms an extension of, cylindrical surface 54 of the drum 15 for engagement with the workpiece 10.

Figure 8:
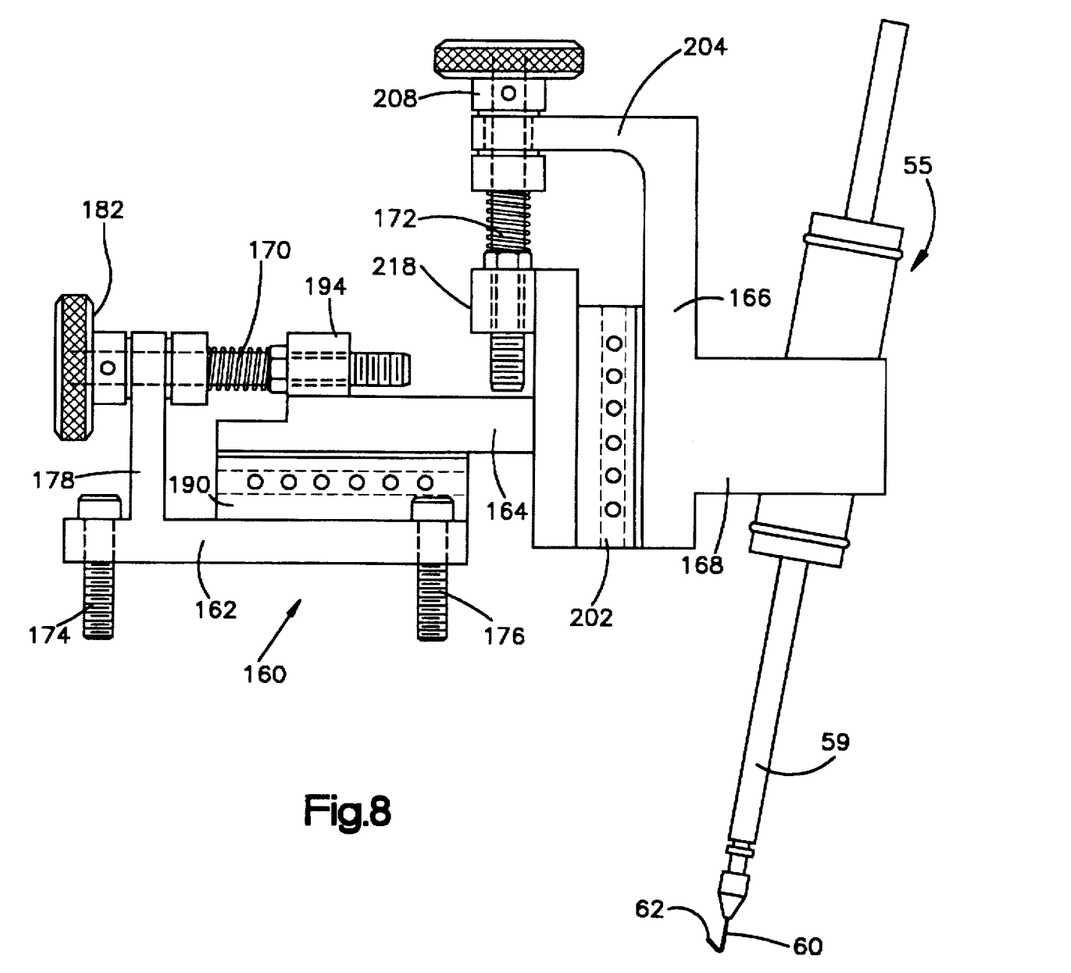
FIG. 8 is an enlarged view of a burner support.

Fourteen burners or jets 55 are provided. The jets 55 are carried by a support 56 and are disposed adjacent the ring 46. The jets are symmetrically disposed about a vertical plane located by the axis of drum rotation while a second set of 14 jets 57 are circumferentially interleaved with the jets 55 to act against the ring 45. One of the supports for the jets 55, 57 is shown in FIG. 8. These supports are those shown in the Hydrogen Sealer application which are adjustable to provide precise jet positioning modified to provide the now desired angular relationship.

Each of the jets includes a body 59 and a projecting nozzle 60. As is best seen in FIG. 3, each nozzle 60 includes a tip portion 62 which is bent upwardly with respect to the remainder of the nozzle at an angle of about 60°. Each burner is preferably positioned such that an extension of the axis of its tip 62 will intersect the projecting lips at a location which is at the center, axially speaking, of the projecting lips. Where 2 mil plastic is being fused, the outlet of the nozzle will preferably be spaced radially inwardly about 0.15 inches from an imaginary extension of the cylindrical surfaces 52, 54.

Figure 7:
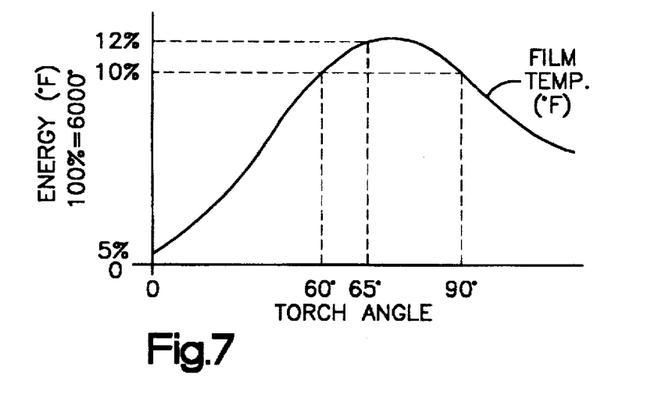
FIG. 7 is a graph showing fusing efficiency with various tip angles.

The tip axis preferably lies in a radial plane including the axis of drum rotation. The tip axis preferably intersects a line located by the intersection of that radial plane with the cylindrical surfaces 52, 54 at between 60°–90° and preferably between 65°–68° as is illustrated by the graph which is FIG. 7.

Turning to FIG. 8, support 160 is provided for supporting and positioning each jet 55 relative to a workpiece. The burner assembly support 160 includes a base 168 and first and second threaded adjusters 170, 172 for positioning the first and second members 164, 166 vertically and horizontally.

The base 162 is fixed to the burner support 56 by means of two bolts 174, 176. The base 162, in turn, rigidly mounts a stanchion 178 which rotatively supports the first threaded connector 170. The first threaded connector 170 carries a knob 182 for effecting rotative adjustments.

The first member 164 is seated horizontally on a seat 190 mounted on and forming a part of the base 162. A threaded block 194 is fixed to the first member 164 and threaded engagement with the first connector 170.

The first member 164 mounts a seat 202 which is bolted to and forms a part of the first member 164. The second member 166 sits vertically against the seat 202.

A stanchion 204 is fixed to the second member 166 and rotatively receives the second threaded connector 172. The second threaded connector 172 carries an adjustment knob 208.

The first member 164 also mounts a block 218 which threadedly engages the second threaded connector 172 by grasping the knob 208 and rotating the second threaded connector 172, an operator may adjust the vertical position of the jet 55.

The yoke 168 is fixed to the second member 166 and grasps the burner body 59. The body is at an acute angle with the horizontal and vertical adjustment paths to provide the desired and described angular relationship of the tip 62 with a workpiece.

Operation

The web 10 is fed from the supply 12 along its path of travel to the trimming mechanism 14. As taught in the Hydrogen Sealer application, the supply may be an in-line system with a printing press and folding mechanism or, alternately, may be a pre-printed and folded supply when printed tubular labels are formed. Again, a preferred difference over the machine and method of the Hydrogen Sealer application is that the web will be a clear polyethylene plastic, folded, treated or printed surface to treated surface.

The cutters 24, 25 are laterally adjusted until the score cut and fused edges being formed are appropriately aligned with the stainless rings 45, 46 to provide projecting lips 49, 50 of appropriate axial dimension. Next, locations of the burner support 56 and of the jets 55, 57 are adjusted relative to the support and rings 46, 45 until appropriate orientation of each of the burner tips relative the projecting lips is achieved.

Where labels are being formed from 2 mil material, the first two and the last two of the burners 55, 57, circumferentially speaking, will not be used. Rather, the flame jets will be produced with the centermost 10 burners of each set with the first 7, circumferentially speaking, in the direction of web travel forming the seal while the remaining 3 function to smooth and anneal the seal.

Once the machine is properly adjusted and the burners are ignited the feed of the web is commenced. Both the rotational speed of the trimming mechanism roll 18 and the drum 15 are such that their surface speeds equal the lineal speed of web travel, so that there is no relative slippage between the web and either the roll or the drum. The air pressure supplied to the cutters 24, 25 is adjusted as required to provide appropriate biasing of the score cutters 30 against the edge portions to produce quality flush trimming of the edge portions 49, 50 with the portions tacked together. The web passes from the trimming mechanism up over the drum with the edge portions projecting as depicted in FIG. 3.

Tension of the web is adjusted to assure firm, non slipping engagement of the web against the drum without excessively stretching the web. Tension may be controlled with anyone of many well known procedures such as by adjusting paired nip rolls 95, FIG. 1. Thus, web tension alone functions to hold the web slip free on the drum without rollers or other hold down mechanisms.

As is shown in FIG. 3, the upward and inward direction of the flame as depicted at 90 tends to trap the products of combustion under the projecting lips 49, 50 resulting in very efficient heat utilization. In addition the impingement of the flames angularly against the drum is believed to create a beneficial turbulence. It is also believed that as heat escapes, aided by the turbulence, by rising around the projecting lips and seal formation is further enhanced by convection heating of the uppermost layer 49.

As the bead seals are formed the drum section engaging the non projecting portions of the web functions as a heat sink. These non projecting portions are maintained sufficiently cool by the drum to avoid any distortion of printing or other web surface treatment and to avoid size modification of the other portions.

The present invention has been described with a degree of particularity, but it is the intent that the invention include all modifications from the disclosed preferred process falling within the spirit and scope of the appended claims.

I claim:

1. A process of bonding plastic webs comprising:
   a) passing a plurality of superposed webs over a surface of a rotating metal drum while maintaining edge portions of the webs outwardly of and projecting laterally from an edge of the surface;
   b) impinging a thin, highly intense flame on the drum and edge portions by directing it upwardly at an acute angle against the drum and the edge portions to directly heat one of the edge portions while connectively heating another edge portion shielded from the flame by the one edge portion; and
   c) continuing to heat the edge portions until they are fused.

2. The process of claim 1 wherein the angle is from about 65° to 68°.

3. The process of claim 1, further including the step of score trimming the superposed edge portions prior to flame impingement.

4. The process of claim 3 wherein the edge portions are tacked together as the score trimming step is performed to maintain registration of the portions.

5. The process of claim 1 wherein the webs each have a treated surface and the webs are superposed treated surface to treated surface.

6. A tube-forming machine comprising:
   a) a supply for delivering an elongate, folded, plastic web along a path of travel;
   b) a cutting mechanism positioned along the path including a roll having a section delineating a portion of the path and a cutter having a cutting head and means to bias the head toward the roll section;
   c) a rotatable sealing drum having a cylindrical web engaging surface, a section of the surface delineating a further portion of the path;
   d) a set of flame-emitting nozzles positioned adjacent the drum surface section, the nozzles of the set being circumferentially spaced;
   e) each of the nozzles including a tip disposed within the cylinder delineated by said drum surface and having an axis disposed in an imaginary radial plane which includes an axis of drum rotation, each tip being directed radially upwardly to impinge its flame against portions of a web being fed along the path when such portions project from said drum surface section;
   f) said tip axis being at an angle from 65° to 68° with an imaginary line located by the intersection of such imaginary plane with said drum surface section; and
   g) said 65° to 68° orientation of the tip axis being canted toward the drum.

7. The machine of claim 6 wherein:
   a) the drum has a pair of axially spaced, cylindrical, web-engaging surfaces;
   b) there are a pair of cutting mechanisms; and
   c) there are two sets of nozzles each positioned to emit flames against web portions respectively projecting from surface sections of respectively associated drum surfaces whereby the machine may be used concurrently to produce a pair of tubes.

8. The machine of claim 6 wherein the cutting head is a scoring head.

9. A machine for fusing superposed and juxtaposed layers of plastic together comprising:
   a) a rotatable drum including a cylindrical web engagement surface extending from one side edge toward a remote side of the drum, a section of the surface forming a segment of a web path of travel;
   b) supply and output rolls positioned along the path of travel respectively upstream and downstream from the drum;
   c) means to tension a web section engaging said surface and feed the web section at a speed equal to the surface speed of the surface;
   d) a set of circumferentially spaced nozzles each including a tip having an axis generally disposed in a radial plane of the drum, the plane including an axis of drum rotation;
   e) the tips each being disposed within an imaginary cylindrical extension of the surface extending outwardly from the side edge in a direction away from the remote side; and
   f) the tips each being oriented to direct a flame toward a side of the drum and the cylindrical extension at a location near said edge whereby to impinge on superposed, juxtaposed edge portions of a web projecting from the surface past said side edge.

10. A process of converting a clear polyethylene web folded treated surface to treated surface as steps in the manufacture of sleeve labels comprising
    a) feeding the web along a path from a supply to and around a hardened cylindrical roll while rotating the roll at a surface speed equal to the lineal speed of web feed;
    b) biasing a score cutter against the web as it passes around the roll thereby flush trimming edge portions of the web remote from the fold and tacking the edge portions together;
    c) feeding the trimmed web over a large drum having a cylindrical surface web engagement section while rotating the drum to produce a surface speed of the section equal the lineal speed of web travel;
    d) causing said trimmed portions to project outwardly past an edge of the section as the web is fed over the drum;
    e) fusing the trimmed portions by directing a set of circumferentially spaced flames produced by stoichiometric mixtures of hydrogen and oxygen upwardly at an angle of from 90° to 60° relative to the axis of drum rotation against the section edge and the trimmed portions as they project from the section; and,
    f) causing the drum section to function as a heat sink to maintain remaining portions of the web other than the trimmed portions sufficiently cool to avoid distortion of the web surface treatment and size modification of the remaining portions.

11. A process of bonding plastic webs comprising:
    a) passing a plurality of superposed webs over a surface of a rotating metal drum while maintaining edge portions of the webs outwardly of and projecting laterally from an edge of the surface;
    b) maintaining the webs under tension as they are passed over the drum to maintain the webs in tight, non slip relationship with the drum through tension alone and without any hold down mechanism;
    c) impinging a thin, highly intense flame on the edge portions by directing it upwardly against the edge portions to directly heat one of the edge portions while connectively heating another edge portion shielded from the flame by the one edge portion, the flame being emitted from a nozzle, including an outlet tip portion having an axis disposed in a radial plane which includes the axis of drum rotation and the tip axis also being at an acute angle with the axis of drum rotation; and
    d) continuing to heat the edge portions until they are fused.

12. The process of claim 11 wherein the angle is from about 65° to 68°.

13. The process of claim 11, further including the step of score trimming the superposed edge portions prior to flame impingement.

14. The process of claim 13 wherein the edge portions are tacked together as the score trimming step is performed to maintain registration of the portions.

15. The process of claim 11 wherein the webs each have a treated surface and the webs are superposed treated surface to treated surface.

16. The process of claim 1 further including the step of tensioning the web as it is passed over the drum and maintaining web to drum contact through such tension while leaving an upper surface of the webs exposed to the atmosphere and free of any hold down mechanism in an area adjacent the flame impingement.

17. The process of claim 10 wherein the cutting step also attaches the edges together.

18. The process of claim 10 wherein the cutter is air biased against the web.

19. The process of claim 10 wherein the angle is from about 65° to 68°.

20. The process of claim 10 wherein there are two folds, a pair of cutters and twin sets of flames concurrently forming a pair of tubes as the web is passed over a split drum.

21. A process of bonding plastic webs comprising:
   a) passing a plurality of superposed webs over a surface of a rotating metal drum while maintaining edge portions of the webs outwardly of and projecting laterally from an edge of the surface;
   b) emitting a thin, highly intense flame from a nozzle, including an outlet tip portion having an axis disposed in a radial plane;
   c) impinging the flame on the drum and edge portions by directing it upwardly at an angle of from about 65° to 68° with an axis of drum rotation, the impingement being against the drum and the edge portions to directly heat one of the edge portions while connectively heating another edge portion shielded from the flame by the one edge portion; and
   c) continuing to heat the edge portions until they are fused.

22. A process of converting a clear polyethylene web folded treated surface to treated surface as steps in the manufacture of sleeve labels comprising
   a) feeding the web along a path from a supply to and around a hardened cylindrical roll while rotating the roll at a surface speed equal to the lineal speed of web feed;
   b) biasing a score cutter against the web as it passes around the roll thereby flush trimming edge portions of the web remote from the fold and tacking the edge portions together;
   c) feeding the trimmed web over a large drum having a cylindrical surface web engagement section while rotating the drum to produce a surface speed of the section equal the lineal speed of web travel;
   d) causing said trimmed portions to project outwardly past an edge of the section as the web is fed over the drum;
   e) fusing the trimmed portions by directing a set of circumferentially spaced flames produced by stoichiometric mixtures of hydrogen and oxygen upwardly at an angle of from 65° to 68° relative to the axis of drum rotation against the section edge and the trimmed portions as they project from the section; and,
   f) causing the drum section to function as a heat sink to maintain remaining portions of the web other than the trimmed portions sufficiently cool to avoid distortion of the web surface treatment and size modification of the remaining portions.

23. A process of bonding plastic webs comprising:
   a) passing a plurality of superposed webs over a surface of a rotating metal drum while maintaining edge portions of the webs outwardly of and projecting laterally from an edge of the surface;
   b) maintaining the webs under tension as they are passed over the drum to maintain the webs in tight, non slip relationship with the drum through tension alone and without any hold down mechanism;
   c) impinging a thin, highly intense flame on the edge portions by directing it upwardly against the edge portions to directly heat one of the edge portions while connectively heating another edge portion shielded from the flame by the one edge portion, the flame being emitted from a nozzle, including an outlet tip portion having an axis disposed in a radial plane which includes the axis of drum rotation and the tip axis also being at an angle of from about 65° to 68° with the axis of drum rotation; and
   d) continuing to heat the edge portions until they are fused.

* * * * *